US012755259B2

(12) United States Patent
Wu et al.

(10) Patent No.: US 12,755,259 B2
(45) Date of Patent: Oct. 6, 2026

(54) SYSTEMS AND METHODS FOR TARGET BRIDGING

(71) Applicant: TBCASOFT, INC., Sunnyvale, CA (US)

(72) Inventors: Ling Wu, San Jose, CA (US); Dennis Wong, Fremont, CA (US); Simon Ma, Mountain View, CA (US); William Wu, Saratoga, CA (US); Shieng-Chyuarn Jang, Newark, CA (US)

(73) Assignee: TBCASOFT, INC.

( * ) Notice: Subject to any disclaimer, the term of this patent is extended or adjusted under 35 U.S.C. 154(b) by 0 days.

(21) Appl. No.: 18/727,679

(22) PCT Filed: Nov. 9, 2022

(86) PCT No.: PCT/US2022/079513
§ 371 (c)(1),
(2) Date: Jul. 9, 2024

(87) PCT Pub. No.: WO2023/132995
PCT Pub. Date: Jul. 13, 2023

(65) Prior Publication Data
US 2025/0094946 A1 Mar. 20, 2025

Related U.S. Application Data

(60) Provisional application No. 63/297,791, filed on Jan. 9, 2022.

(51) Int. Cl.
*G06Q 20/10* (2012.01)

(52) U.S. Cl.
CPC .................................... *G06Q 20/10* (2013.01)

(58) Field of Classification Search
CPC . G06Q 20/10; G06Q 20/3274; G06Q 20/3276
See application file for complete search history.

(56) References Cited

U.S. PATENT DOCUMENTS

2008/0103923 A1 5/2008 Rieck
2014/0297441 A1 10/2014 Thams
2015/0235198 A1* 8/2015 Liezenberg ......... H04W 12/068 455/418

(Continued)

OTHER PUBLICATIONS

International Search Report and Written Opinion mailed on Feb. 2, 2023 in International Patent Application No. PCT/US22/79513, filed Nov. 9, 2022.

(Continued)

*Primary Examiner* — William E Rankins
(74) *Attorney, Agent, or Firm* — Huan-Yi Lin

(57) ABSTRACT

The present disclosure relates to target bridging technology which enables a payer of a first service provider to present a target of a second service provider to a receiver of the second service provider who does not recognize a target of the first service provider. The inventive system for target bridging service involves all or some of a portable device of the payer, a first management system of the first service provider, a scanning system of the receiver, a second management system of the second service provider, a bridging system of a bridging service provider and a target generator.

37 Claims, 6 Drawing Sheets

(56) References Cited

U.S. PATENT DOCUMENTS

| | | | | |
|---|---|---|---|---|
| 2015/0332228 | A1 | 11/2015 | Kimberg | |
| 2016/0267452 | A1 | 9/2016 | Kim | |
| 2019/0205865 | A1 * | 7/2019 | Jamkhedkar | G06Q 20/3274 |
| 2020/0175496 | A1 * | 6/2020 | Finke | G06Q 20/3274 |
| 2021/0383377 | A1 * | 12/2021 | Zhou | H04L 9/3213 |
| 2023/0162188 | A1 * | 5/2023 | Silver | G06Q 20/389 705/67 |
| 2025/0010753 | A1 * | 1/2025 | Van | G06Q 20/3274 |

OTHER PUBLICATIONS

European Patent Office(EPO), Supplementary European Search Report along with Reference List issued on Jul. 8, 2025, in European application No. 22919231.5, filed on Aug. 9, 2024.

* cited by examiner

SYSTEMS AND METHODS FOR TARGET BRIDGING

BACKGROUND OF THE INVENTION

Related Application

This application claims the benefit of the U.S. provisional application 63/297,791 filed on Jan. 9, 2022, titled "SYSTEMS AND METHODS FOR TARGET BRIDGING TECHNOLOGY," which is incorporated herein by reference at its entirety.

Field of the Invention

The present invention relates to a target bridging technology which enables payers of a service provider to present a target of another service provider. The present disclosure also relates to systems and methods of a target bridging service which enable transactions between service providers with different target formats.

DESCRIPTION OF RELATED ART

A payment method is the way which merchants can collect payments from their customers. A payment can be made via various route, including cash, cheque, debit, credit, bank transfers, or mobile payments.

Contactless payment is a method to perform payments without physical contacts. Common examples of contactless payment include radio-frequency identification (RFID) payment, near-field communication (NFC) payment, and quick response code (QR code) payment via smart phones and other portable devices. Traditional credit cards, debit cards, and smart cards may be used for contactless payments as well if merchants have appropriate sensing devices. Recently, due to the COVID-19 pandemic, contactless payments are considered as safer payment methods compared to traditional cash and card transactions.

Among those common contactless payment methods, QR code payment is performed by scanning a QR code from a mobile app or from a merchant point of sale (POS) system. In merchant presented mode (MPM), the consumer scans the QR code displayed by the merchant with their smartphone to pay. By contrast, in consumer presented mode (CPM), the merchant scans the QR code displayed by the consumer to receive the payment. With QR code payment, a transaction can be done even without the infrastructure traditionally associated with electronic payments, such as payment cards, payment networks, payment terminal and merchant accounts. A system implementing this payment method between a payer and a receiver of a single service provider is performed within the network of the service provider.

In recent years, many mobile payment service providers have emerged and acquired their own users and merchants. However, since two service providers use different QR code formats, a payer of a service provider and a receiver of another service provider cannot complete transactions via QR code. For example, the payer of the first service provider, e.g. a consumer, cannot buy a product from the receiver of the second service provider, e.g. a merchant, because the receiver's device, e.g. POS, does not recognize the QR code of the first service provider presented by the payer's portable device, e.g. a smart phone. One solution to this problem is that a first service provider and a second service provider reach a bilateral cooperation agreement and modify their systems so that receivers of the second service provider, such as merchants, can recognize the QR code of the first service provider provided by payers of the first service provider, such as users. However, it may be costly and time consuming to modify their systems to provide such function. In addition, the complexity increases exponentially when more service providers would like to recognize each other's QR code.

In addition, global village has certainly promoted more and more international travel activities across the world for both business and recreation. To purchase merchandise and services in foreign countries arising from these activities, there is a need for making cross-border QR code payment. In general, all available service providers for QR code payment in a foreign merchant store are different from the service providers a customer used in his/her home country. The same problem arises in this situation.

Accordingly, it is desirable to develop methods and systems to enable cross-service provider QR code recognition to facilitate transactions.

SUMMARY OF THE INVENTION

To resolve the problem of QR code recognition to facilitate transactions between two different service providers, the target bridging technology is provided to enable transactions between a payer of a first service provider, such as a consumer, and a receiver of a second service provider, such as a merchant. The second service provider may be any other service provider around the world using target standard, format, and/or rule ("target format") different from the first service provider. As such, the target bridging technology resolves the problem of cross-service-provider transactions and satisfies the long-felt need. It also brings unexpected results which may revolutionarily improve transactions in related industries around the world.

The present disclosure relates to systems and methods of a bridging service which enable transactions between two or more service providers with different target formats. Each service provider has its own network, users, and merchants. In one aspect, the present invention comprises the steps of: (1) receiving, by a first management system of the first service provider, a target content of a second service provider or a bridging target generated based on the target content, from a bridging system of a bridging service provider for the payer; and (2) wirelessly providing, by the first management system of the first service provider, the target content of the second service provider or the bridging target, to the portable device of the payer to present the bridging target generated based on the target content to the scanning system of the receiver of the second service provider, which recognizes the bridging target.

In another aspect, the present invention comprises the steps of: (1) receiving, by a bridging system of a bridging service provider, a target content of a second service provider or a bridging target generated based on the target content, from a target generator; and (2) providing, by the bridging system of the bridging service provider, the target content or the bridging target to the first management system of the first service provider, so that the portable device of the payer presents the bridging target generated based on the target content to the scanning system of the receiver which recognizes the bridging target. In both the above aspects, the scanning system of the receiver of the second service provider does not recognize a target of the first service provider. Moreover, the second service provider may be even located in different country from that of the first service provider.

In one embodiment, the target used by the first service provider and the second service provider includes but not limited to 1-dimensional, 2-dimensional, and 3-dimensional quick response code" (QR code), NFC (Near-field Communication) tag, voice signature, and fingerprint. Each service provider may have its own proprietary data format for targets and target contents. The target, such as QR code, may contain the information of the payer and/or receiver, and enables the second service provider to initiate a transaction upon scanning or sensing the target.

In one embodiment, a request for the target content is made by a portable device of the payer and relayed to the bridging service provider before the first management system of the first service provider receives the target content of the second service provider or the bridging target generated based on the target content. In one embodiment, the target content or the bridging target of the second service provider is generated by a target generator and is provided to the first management system of the first service provider via the bridging system of the bridging service provider. The target generator may be a system/module of the second service provider, or it may be a system/module of the bridging service provider.

In one embodiment, a second management system of the second service provider may make a request for a transaction, e.g. payment, to the bridging service provider to process the transaction between the payer and the receiver. The bridging system of the bridging service provider may then relay the transaction request to the first management system of the first service provider which may further relay the transaction request to the portable device of the payer for approval, or approve the transaction if authorized beforehand, e.g. the payment is under a predetermined amount.

In one embodiment, the bridging target is valid only for a predetermined period. The related systems may record a first time stamp indicating the time the target content or the bridging target is generated, and may record a second time stamp indicating the time the bridging target is scanned. If the time difference between the first time stamp and the second time stamp exceeds a predetermined period, the transaction may be considered invalid. In another embodiment, the target content or the bridging target may comprise the first time stamp and the period thereafter for the target content or the bridging target to remain valid.

In one embodiment, the bridging service provider is the first service provider or the second service provider. In another embodiment, the bridging service provider is neither the first service provider nor the second service provider.

In one embodiment, the bridging system of the bridging service provider may generate a bridging transaction identifier for the transaction so that the related transaction information may be connected by the bridging transaction identifier. To enhance privacy protection, the bridging system of the bridging service provider may generate a job identifier (job ID) for each bridging transaction identifier for recording the transaction, which may be stored in a distributed ledger, such as a blockchain.

In one embodiment, the bridging system of the bridging service provider may record each transaction with a job ID, a payer virtual wallet, a receiver virtual wallet, an amount and a currency type. In another embodiment, the bridging system of the bridging service provider may generate multiple job IDs for a single bridging transaction identifier, in which case multiple parts of the transaction may be recorded using different job IDs that all correspond to one bridging transaction identifier.

DETAILED DESCRIPTION OF PREFERRED EMBODIMENTS

Figure 1:
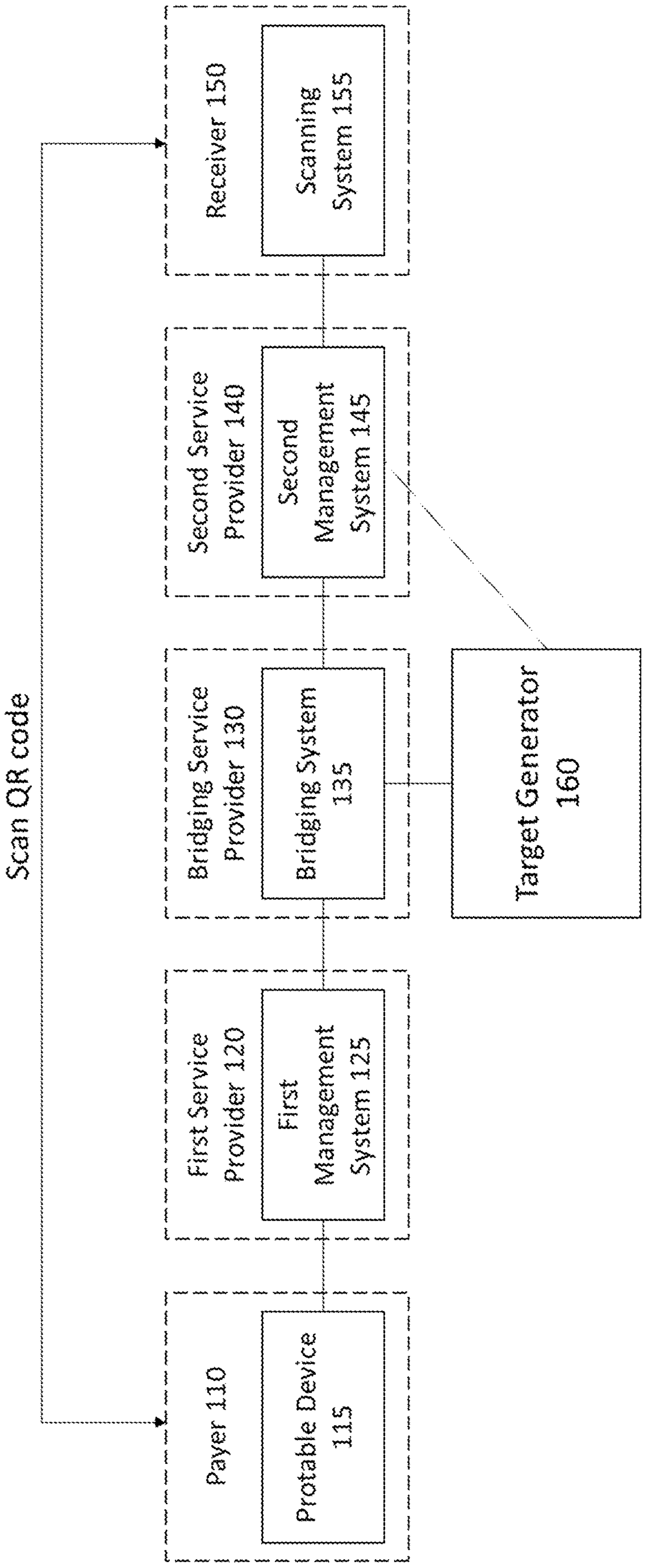
FIG. 1 is a block diagram illustrating an embodiment of a system for target bridging between a payer of a first service provider and a receiver of a second service provider.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

As used in the specification and claims, the term "service provider" refers to a party providing digital property transfer service via sending and/or receiving target information or a target. In one embodiment of this disclosure, a service provider is an electronic payment or transfer system provider which enables electronic payments or transfers of digital property between its payers and receivers utilizing a target to exchange information, such as a payer identifier, a receiver identifier, a time stamp and a request for transaction. A service provider usually contains management system(s) to execute its functionalities related to digital property transactions.

The term "payer" used herein refers to a party, an individual or an entity, who authorizes a transaction to transfer his/her digital properties to others. A payer of a service provider is also a user of the service provider who holds an account of the service provider. The user is able to transfer digital properties stored in the account to others and receive digital properties from others. In one embodiment, the account is implemented by a virtual wallet. The payer may present a target via his/her mobile device to a receiver.

The term "receiver" refers to a party, an individual or an entity, who receives digital properties transferred from others. A receiver of a service provider may be either a user or a merchant of the service provider. A merchant of a service provider is able to recognize a target of the service provider. However, a merchant of a service provider who may not hold an account of the service provider and, thus, may not be a user of the service provider. In other words, the merchant of the service provider may carry out the merchant function through a merchant acquirer, and do not have direct relationship with the service provider.

The term "digital property" used herein refers to anything that exists in digital form and has economic value, including but not limited to multiple types of digital assets, credits, and obligations, such as digital currencies, digital securities, digital bonds, digital futures, digital precious metals, non-fungible tokens (NFTs), digital coupons, and digital fee tokens. Digital currencies may include but not limited to digital US Dollars, digital Japanese Yens, digital Euros, and digital New Taiwan Dollars. Digital securities may include but not limited to digital Apple stocks, digital Google stocks, and digital mutual funds. Digital precious metals may include but not limited to digital gold, digital platinum, and digital silver. Digital futures may include but not limited to digital futures of coffee beans, soy beans, and corns. An NFT may be an electronic record a party owned/controlled in which the party has a right or interest, which includes but not limited to photography, logos, illustrations, animations, audiovisual media, presentations, spreadsheets, digital paintings, word documents, electronic mails, websites, and a multitude of other digital formats and their respective metadata.

The term "target" used herein refers to a medium containing information in a format which can be recognized or sensed by specific devices. Examples include but not limited to barcode, QR code, NFC (Near-field Communication) tag, voice signature, and fingerprint. The target information may be resolved by extracting features embedded in the target, for example, by scanning QR code, sensing NFC tag, extracting voice signature from voice, or scanning fingerprint to extract the features and obtain the target information contained therein. In an embodiment of the present invention, the target is a QR code.

The term "target content" used herein refers to the information contained in the target, which includes but not limited to locators, identifiers, and trackers. The target content may be in a format of a string. In one embodiment of the present invention, a target content contains a payer identifier, a receiver identifier, and/or a request for transaction, which provides the information of a payer and/or a receiver. A target may be generated based on the target content.

The term "portable device" used herein refers to a device with basic computing resources (in the form of a processor, memory, and storage) and wireless communication, such as telecommunication network, WiFi, Bluetooth, satellite, radio broadcast, microwave, infrared, etc. Examples include but not limited to laptops, tablets and smartphones.

The term "bridge" or "bridging" used herein refer to the system or the method that enables a payer of a first service provider to present a target of a second service provider to a receiver of the second service provider, who does not recognize a target of the first service provider, so that a transaction between the payer and the receiver can be completed. Since the first service provider and the second service provider use different target formats or rules, the receiver of the second service provider does not recognize a target of the first service provider. In some embodiments, in the consumer presented mode (CPM), the bridging service enables a consumer's mobile device to present a QR code recognizable by the merchant device (e.g. POS) which cannot recognize a QR code of the consumer's service provider.

The term "bridging service provider" refers to a service provider that provides bridging technology to other service providers. A bridging service provider may be the first service provider, the second service provider, or a separate bridging service provider which is neither the first service provider nor the second service provider. And the term "bridging system" refer to the system(s) of the bridging service provider to execute functionalities of bridging service.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The present invention is related to providing target bridging service between a first service provider and a second service provider, in order to enable a transaction between a payer of the first service provider and a receiver of the second service provider by target scanning or sensing. A target, such as QR code, in the mobile payment industries, plays a similar role to a credit card number in the conventional payment industries. The holder of a credit card can only use the card for payment in a merchant store which recognizes the credit card number. Similarly, a payer of a first mobile payment company (first service provider) can only use the target (e.g. QR code) of the first mobile payment company at receiver which recognizes the target (usually a merchant store of the first service provider). A receiver of the first service provider cannot recognize a target of the second service provider with its device (e.g. POS). Similarly, a receiver of the second service provider cannot recognize a target of the first service provider with its device. In one embodiment, a bridging service provider may provide payers of the first service provider with a bridging target or target content of multiple other service providers (such as second service provider and many other similar service providers) around the world so that the payer of the first service provider may complete transactions in all merchant stores that recognize the target of any one of these multiple other service providers. For example, a first country may have 10 major service providers and a second country may have 5 major service providers. It may be complicated for each of the 10 service providers in the first country to engage with each of the 5 service providers in the second country. In this situation, the bridging service provider may provide such target bridging service to connect all 15 service providers in both countries so that a payer of any service provider may complete a transaction at a receiver (e.g. merchant store) of any other service providers.

As shown in FIG. 1, the system for target bridging service 100 comprises a portable device 115 of a payer 110, a first management system 125 of a first service provider 120, a scanning system 155 of a receiver 150, a second management system 145 of a second service provider 140, a bridging system 135 of a bridging service provider 130 and a target generator 160. The payer 110 is a user of the first service provider 120 having a portable device 115, such as a smartphone, wirelessly connected to a first management system 125 of the first service provider 120. The receiver 150 is a merchant or a user of the second service provider 140 having a scanning system 155 connected wirelessly or with wires to a second management system 145 of the second service provider 140. In the example shown in FIG. 1, the payer 110 transfers a digital property to the receiver 150. The bridging service provider 130 has a bridging system 135 communicatively connected to both the first management system 125 and the second management system 145 and acts as the "bridge" between two different service providers. The target generator 160 is connected to the bridging system 135 and/or the second management system 145. In one embodiment, the target generator 160 is configured to be connected to or embedded in the second management system 145, and may generate target contents or bridging targets of the second service provider 140. In an alternative embodiment, the target generator 160 is a module independent of any service providers. In this case, the target generator 160 may be a system embedded in or connected to the bridging system 135, and may generate target contents or bridging targets of multiple service providers.

Each of the first service provider 120 and the second service provider 140 operates a transaction network among its users and merchants, and has its own target standard, format, and/or rule. Thus, a payer and a receiver of the first service provider 120, for example a user (payer) and a merchant (receiver), can complete a transaction, for example a payment or transfer, within the first service provider's network by target scanning. The same situation applies to a payer and a receiver of the second service provider 140. However, to complete transactions and/or other communications between a payer of the first service provider 120 and a receiver of the second service provider 140, the two service providers are configured to communicatively connect to the bridging service provider 130.

Among other functions of a service provider, the first management system 125 of the first service provider 120 is configured to implement additional functions associated with a bridged transaction. The functions may include (1) selecting an acquirer (i.e. the second service provider) for a transaction, (2) requesting a target content or bridging target of the second service provider 140 via the bridging system 135, (3) receiving the target content or bridging target, and provide the same to the payer 110, (4) receiving the transaction request from the bridging system 135, (5) returning a transaction approval to the bridging system 135, and (6) handling notifications from the bridging system 135. The bridging system 135 may provide a target content or bridging target of each of multiple service providers around the world, where these multiple service providers form a bridging network. The payer 110 or the first management system may select a second service provider from the bridging network. Alternatively, based on the location of the payer's portable device, the portable device may display all available service providers in the region/country for the payer 110 to select for a transaction. The location may be determined by a GPS system of the payer's portable device.

For identifying the payer requesting for a bridging target, the first management system 125 of the first service provider 120 may assign a bridging payer identifier to the payer 110, and link the bridging payer identifier with the target request. The target request may then be relayed to the bridging system 135 of the bridging service provider 130 with the bridging payer identifier. The bridging payer identifier assigned by the first management system 125 may be an original user identifier of the payer 110 used within the network of the first service provider 120, such as the account number or the virtual wallet ID of the payer. Alternatively, to enhance security, the first management system 125 of the first service provider 120 may particularly create the bridging payer identifier which is different from the original user identifier of the payer 110. In addition, a payer of a service provider, such as the user of the first service provider, may be assigned a virtual wallet with a bridging wallet identifier by the bridging system 135. Therefore, the first service provider 120 may also use the bridging wallet identifier assigned by the bridging system 135 as the bridging payer identifier for the target request, instead of using a bridging payer identifier created by the first management system 125 of the first service provider 120. In order to provide the returned bridging target to the requesting payer 110, the first management system 125 of the first service provider 120 is configured to receive a returned target content or bridging target with previously provided bridging payer identifier, and then provide the target content or bridging target to the payer 110 based on the bridging payer identifier mapped to the payer 110.

For approving a bridged transaction, the first management system 125 of the first service provider 120 is configured to receive a transaction request, e.g. payment request, from the bridging system 135 and return the transaction approval, e.g. payment approval, to the bridging system 135. The first management system 125 of the first service provider 120 may relay the transaction request to the payer 110 based on the bridging payer identifier provided by bridging system 135. After the payer 110 approves the transaction and returns the approval, the first management system 125 of the first service provider 120 may return the transaction approval to the bridging system 135 to process the transaction. Alternatively, based on the setting or the agreement, the first service provider 120 may also be authorized to approve the transaction without a further confirmation by the payer 110. For example, the amount of payment is within a predetermined number. In this case, the first management system 125 of the first service provider 120 may return the transaction approval to the bridging system 135 by itself.

The bridging system 135 of the bridging service provider 130 may be configured to perform three functions-third party target content/bridging target provider, third party authorization proxy, and third party clearing house. First, the bridging system 135 of the bridging service provider 130 may provide a target content or bridging target (e.g. target content or bridging target of the second service provider 140 in one embodiment) to the first management system 125. Second, the bridging system 135 of the bridging service provider 130 may function as a third party authorization proxy to relay the transaction request and approval between the first management system 125 and the second management system 145. Third, the bridging system 135 of the bridging service provider 130 may function as a third party clearing house to bridge and clear the transactions between different service providers with a transaction bridge mechanism, for example clearing multiple transactions between the first service provider and the second service provider, based on the related transaction information recorded.

For providing a bridging target, the bridging system 135 of the bridging service provider 130 is configured to receive a request for a bridging target from the first management system 125, relay the request to the target generator 160, and provide the target content or bridging target back to the first management system 125. The bridging system 135 of the bridging service provider 130 may first identify the location of the payer's portable device 115 and then determine the list of available service providers in the bridging network for that location (e.g. a foreign region/country). Such list of available service providers is provided to the portable device 115 for the payer 110 to select. In this embodiment, after the payer 110 selects the second service provider 140 for a bridging target, the bridging system 135 receives the request for the bridging target of the second service provider. Then, the bridging system 135 may assign a bridging transaction identifier to the request, and relay the request to the target generator 160 with the bridging transaction identifier and/or the bridging wallet/payer identifier to generate a target content or bridging target of the second service provider 140. As described before, the bridging wallet identifier is a type of payer identifier from the perspective of the bridging service provider 130, and may be used to identify the payer 110 that initiated the request for a bridging target. After receiving the target content or the bridging target from the target generator 160, the bridging system 135 of the bridging service provider 130 may map the bridging transaction identifier to the bridging payer identifier and return the target content or bridging target to the first management system 125. Alternatively, the mapping between the bridging transaction identifier and the bridging payer identifier may also be generated before the bridging system 135 receives the target content or the bridging target.

In another embodiment, without any action from the payer, the first management system 125 of the first service provider may request target content or bridging target of the second service provider from the bridging system 135 of the bridging service provider. In another embodiment, without any action from the first management system 125, the bridging service provider 135 voluntarily provides target content or bridging target of the second service provider to the first management system 125.

For functioning as a third-party authorization proxy which relays the transaction request and approval, the bridging system 135 of the bridging service provider 130 may be configured to relay the transaction request, e.g. payment request, from the second management system 145 to the first management system 125, and relay the transaction approval from the first management system 125 to the second management system 145. The second management system 145 may provide a receiver/merchant identifier representing the identity of the receiver 150 along with the transaction request. Upon receipt of the transaction request (possibly with the bridging transaction identifier and a receiver/merchant identifier provided by the second management system 145), the bridging system 135 of the bridging service provider 130 may use the bridging transaction identifier to find the bridging payer identifier that represents the payer 110 of the first service provider 120. Then, the bridging system 135 of the bridging service provider 130 may return an acknowledgement to the second management system 145 and relay the transaction request with the bridging payer identifier and the receiver/merchant identifier to the first management system 125. After the first management system 125 provides an approval to the transaction request, the bridging system 135 may record the transaction and push the message indicating the transaction is confirmed, e.g. successful payment, possibly with some transaction details to the first management system 125 and the second management system 145.

For functioning as a third party clearing house, the bridging system 135 of the bridging service provider 130 is configured to clear the transactions between different service providers with a transaction bridge mechanism, for example clearing multiple transactions between the first service provider and the second service provider. In one embodiment, each of the first service provider and the second service provider creates an internal transaction ID corresponding to such a cross-service-provider transaction. For example, the first service provider 120 generates an X transaction ID associated with the payer and the second service provider generates a Y transaction ID associated with the receiver. The X transaction ID may be the bridging payer identifier previously generated or a different ID separately generated by the first management system 125. Similarly, the Y transaction ID may be the receiver/merchant identifier previously generated or a different ID separately generated by the second management system 145. To bridge such a transaction between different service providers, the bridging system 135 may use the bridging transaction identifier to map with the internal transaction ID of different service providers, such as X transaction ID and Y transaction ID, and connect related transaction information. The bridging system 135 of the bridging service provider 130 may store and maintain (1) the mapping between the bridging transaction identifier and the internal transaction ID of the first service provider and (2) the mapping between the bridging transaction identifier and the internal transaction ID of the second service provider.

In one embodiment, to enhance privacy protection, the bridging system 135 of the bridging service provider 130 may generate a job ID for each bridging transaction identifier. In one embodiment, to enhance privacy protection, a job ID may be a serial number or a randomly generated number that does not include information related to the payer 110, the first service provider 120, the receiver 150, and the second service provider 140. The bridging system 135 stores and maintains the mapping between the bridging transaction identifiers and job IDs in this embodiment. The bridging transaction identifiers and/or the job IDs may be recorded in a database, including but not limited to a distributed ledger, such as a blockchain. As a result, in one embodiment, the bridging system 135 may record each transaction with a job ID, a payer virtual wallet, a receiver virtual wallet, an amount and a currency.

In another embodiment, the bridging system 135 of the bridging service provider 130 may generate multiple job IDs for a single bridging transaction identifier. Each job ID may correspond to one of payment, refund, and cancellation of the single bridging transaction identifier and be recorded in a database, including but not limited to a distributed ledger, such as a blockchain. Thus, the bridging system 135 of the bridging service provider 130 may provide clearance service for transactions between the first service provider 120 and the second service provider 140 based on the related transaction information recorded in the database. With respect to the details of transaction recording and clearance, International Patent Application PCT/US17/12635, filed on Jan. 6, 2017, titled "DIGITAL PROPERTY MANAGEMENT ON A DISTRIBUTED TRANSACTION CONSENSUS NETWORK", is incorporated herein by reference at its entirety.

Among other functions of a service provider, the second management system 145 of the second service provider 140 is configured to recognize a bridging target scanned by the scanning system 155 of the receiver 150. Since the bridging target is generated based on the target format and rule of the second service provider, the scanning system 155 recognizes the bridging target, just like a target from another payer of the second service provider, and generates a scanned information. The second management system 145 may parse the scanned information to identify the bridging service provider 130, the target generator 160, the bridging transaction identifier and/or the receiver/merchant identifier of the receiver 150. In one embodiment, the second management system 145 may request the target generator 160 to provide the bridging transaction identifier associated with the bridging target scanned by the receiver 150. In addition, the second management system 145 may receive the related transaction information, such as the description of the products or services sold by the receiver 150, the amount, and the currency type. In one embodiment, the second management system 145 may be able to further resolve the identity of the payer through the bridging transaction identifier and the related mappings. The second management system 145 may also separately generate an internal transaction ID, e.g. Y transaction ID, to map with the bridging transaction identifier and the receiver/merchant identifier, and maintain such a mapping. Next, the second management system 145 of the second service provider 140 may provide the transaction request, e.g. payment request, to the bridging system 135. The transaction request may include the bridging transaction identifier, the receiver/merchant identifier, and related transaction information. Lastly, upon receipt of a message confirming the bridged transaction, the second management system 145 may push out a message to notify the receiver 150 of the result, e.g. successful payment.

The target generator 160 is configured to receive target requests and generate bridging targets or target contents of the second service provider. The bridging targets are recognizable by the scanning system 155 of the receiver 150 and the second management system 145 of the second service provider 140. The target request may contain the bridging transaction identifier and/or the bridging wallet identifier which can be linked to the first service provider 120 and/or the payer 110. In addition, the target generator 160 may map the generated target content or bridging target to the bridging transaction identifier and/or the bridging wallet identifier and maintain such a mapping. Next, the target generator 160 provides the target content or the bridging target to the bridging system 135. After the scanning system 155 of the receiver 150 scans the bridging target, upon a request, the target generator 160 may provide the second management system 145 with the bridging transaction identifier mapped to the scanned bridging target. As described before, the target generator 160 may be a module embedded in or connected to the second management system 145. Accordingly, each service provider in the bridging network has its own target generator to generate corresponding bridging targets. Alternatively, the target generator 160 may be a module embedded in or connected to the bridging system 135, which may not be a service provider, to generate target contents or bridging targets corresponding to multiple service providers.

In summary, the bridging service provider 130, such as HIVEX™ of TBCASoft, Inc., provides a target content or a bridging target of the second service provider 140, to the payer 110 of the first service provider 120 so that the payer 110 may present the bridging target of the second service provider 140 to the receiver 150, e.g. a merchant, of the second service provider 140. The scanning system 155 of the receiver 150 (e.g. a merchant) scans the bridging target of the second service provider 140 and recognizes it. After scanning, a transaction request generated by the receiver 150 is relayed to the first service provider 120 through the bridging service provider 130. The first service provider 120 may request the payer 110 to approve the transaction. Upon receiving a transaction approval from the first management system 125 of the first service provider 120, the bridging system 135 of the bridging service provider 130 will then record the transaction in a database or a distributed ledger, such as a blockchain, after which the transaction is considered completed. The related transaction record is then distributed to both the first management system 125 and the second management system 145. The approval and the related transaction record may be further distributed to the receiver 150 (e.g. the merchant).

In an alternative embodiment, the bridging service provider 130 may at the same time be the first service provider 120 or the second service provider 140. For example, when the bridging service provider is the second service provider, the second service provider perform the functions of the bridging service provider, in addition to those of the second service provider. In one embodiment, the second management system also performs the functions of the bridging system. As a result, the data transmission between the bridging system 135 and the first management system 125 or the second management system 145 may be omitted, although the system structure is basically the same as the case where the bridging service provider 130 is neither the first service provider 120 nor the second service provider 140, as described above.

Figure 2:
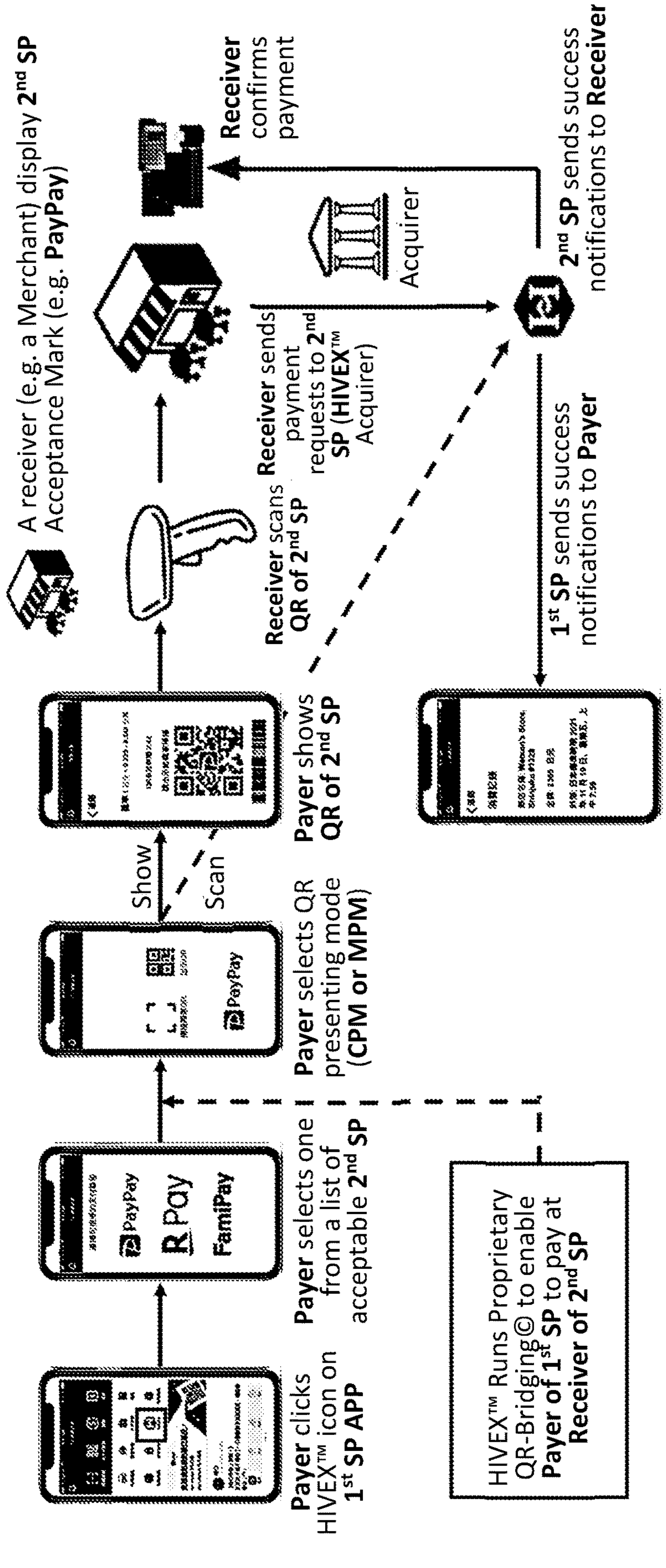
FIG. 2 shows an embodiment of the present invention performing consumer presented mode (CPM) target bridging. $1^{st}$ SP and $2^{nd}$ SP are the abbreviation of the first service provider and the second service provider, respectively.

FIG. 2 shows an embodiment of the present invention performing target bridging in consumer presented mode (CPM). In this scenario, a payer 110 of a first service provider (e.g. LINE Pay Taiwan) travels from Taiwan to Japan, and would like to pay in a merchant store in Japan (e.g. Watson's store), via mobile payment. The merchant store is a receiver 150 here. As shown in FIG. 2, the store accepts PayPay, Rakuten Pay, and FamiPay, all of which are different from the mobile payment services used by the payer. Therefore, the target bridging service of the present invention has to be employed to complete a transaction between two mobile payment service providers. In this example, Line Pay Taiwan (i.e. the first service provider 120) is used to make the payment for the payer 110 and PayPay (i.e. the second service provider 140) is selected to receive the payment for the receiver 150. After the payer 110 selects PayPay as the second service provider 140, the app on the mobile phone (i.e. the portable device 115) may further instruct the payer 110 to select payment mode, i.e. consumer presented mode (CPM) or merchant presented mode (MPM). Some embodiments of cross-service-providers transactions in merchant presented mode are described in International Patent Application PCT/US21/27370, filed on Apr. 14, 2021, titled "METHOD AND SYSTEM FOR RESOLVING A TARGET", which is incorporated herein at its entirety. In consumer presented mode, the payer 110 selects "show QR code", and the app receives a bridging QR code which can be shown on the portable device 115 of the payer 110. The scanning system 155 of the merchant (e.g. Watsons as the receiver 150) then scans the QR code displayed on the portable device 115 of the payer 110. Upon receiving scanned information from the merchant, PayPay (the second service provider 140) may provide a transaction request to HIVEX, a bridging service provider 130. Next, HIVEX records the bridged transaction after receiving a transaction approval from LINE Pay Taiwan (the first service provider 120). HIVEX then provides a transaction confirmation to LINE Pay Taiwan (the first service provider 120) and PayPay (the second service provider 140).

Figure 3:
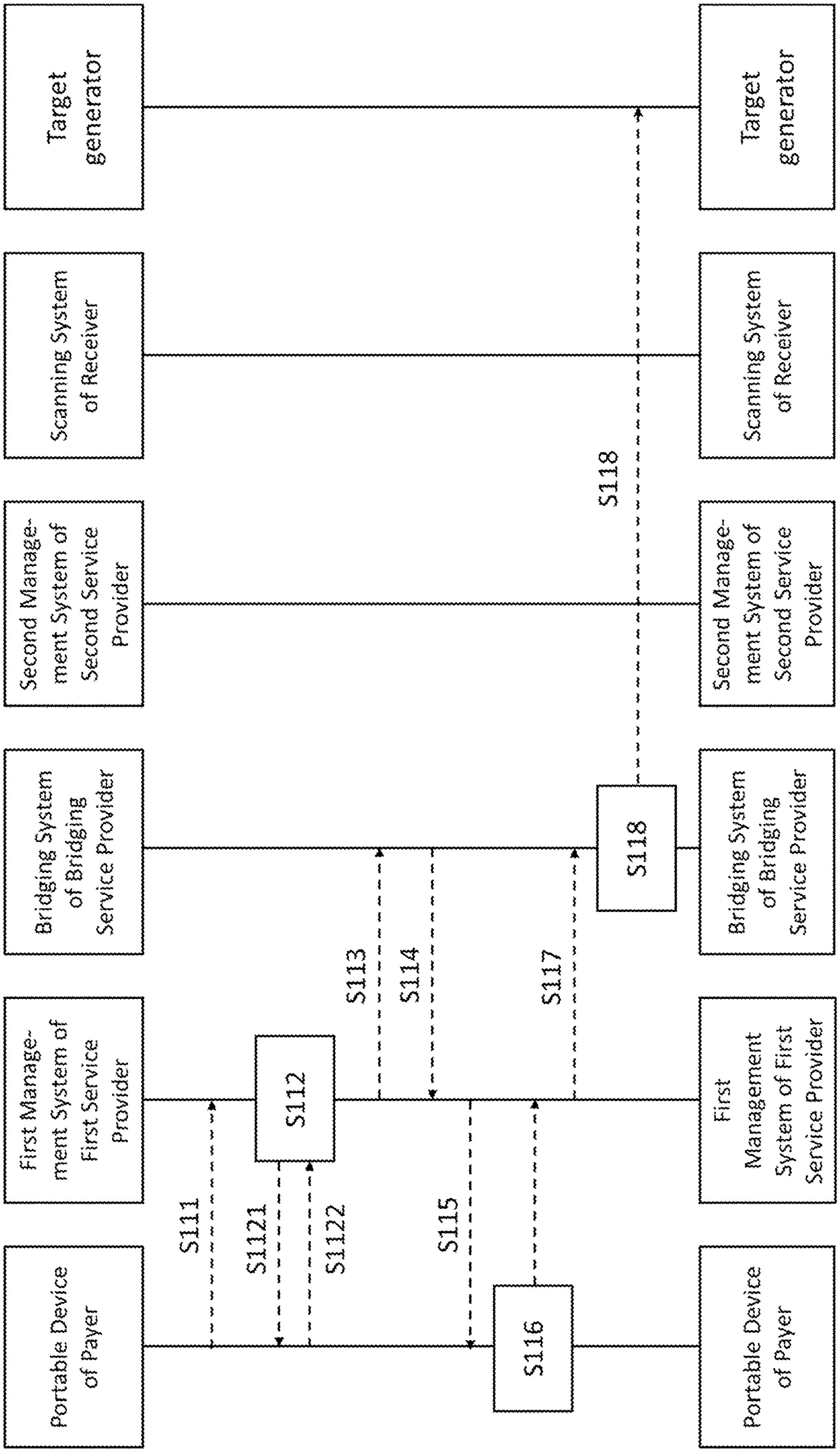
FIG. 3 is a flow chart illustrating the steps of requesting a bridging target from the payer in the system.

FIGS. 3-6 illustrate sequence diagrams of target bridging in one embodiment of the present invention. As shown in FIG. 3, the payer 110 may request a bridging target. In step S111, the payer 110 may send a request for a pick list for the region where the portable device 115 of the payer 110 is located to the first service provider 120, wherein the pick list is a list of available second service provider in the region. In one embodiment, the first management system 125 of the first service provider 120 may also authenticate both the payer 110 and his/her portable device 115 before processing the payer's request further, as shown in steps S112, S1121 and S1122. Step S1121 shows that an authentication request may be sent by the first management system 125 of the first service provider 120 to the portable device 115 of the payer 110. The portable device 115 of the payer 110 may then return the information to verify its identity, as shown in step S1122. In step S113, after receiving the request from the payer 110, the first management system 125 of the first service provider 120 may relay the request to the bridging system 135 of the bridging service provider 130.

In step S114, after receiving the request, the bridging system 135 may look up information of service providers in the bridging network based on the location of the portable device 115 and then return the pick list of available second service provider to the first management system 125. In step S115, the first management system further relays the pick list to the payer 110 after receiving it from the bridging system 135. As described above, the payer 110 may receive the pick list from the first management system 125 of the first service provider 120. Alternatively, if the portable device 115 has updated information of service providers in the bridging network, it may generate the pick list locally by selecting the available service providers in the region and in the bridging network. In step S116, based on the pick list received from the first service provider 120 or generated locally, the payer 110 may select a second service provider 140 from the pick list displayed on the portable device 115 and send the target request to the first management system 125 to request the bridging target of the selected second service provider 140.

In step S117, after receiving the target request, the first management system 125 of the first service provider 120 may send the target request with a bridging payer identifier to the bridging system 135 of the bridging service provider 130. Lastly, in step S118, the bridging system 135 of the bridging service provider 130 may identify the selected second service provider 140, generate a bridging transaction identifier for the received request and send the request to the target generator 160 to request for a bridging target or target content of the second service provider 140. In one embodiment, the target generator 160 is a system of the second service provider 140, and the bridging target or target content is provided by the second service provider 140. In another embodiment, the target generator 160 is not a system of the second service provider 140, but is authorized to generate bridging targets or target contents based on the target formats and rules of the second service provider 140.

Figure 4:
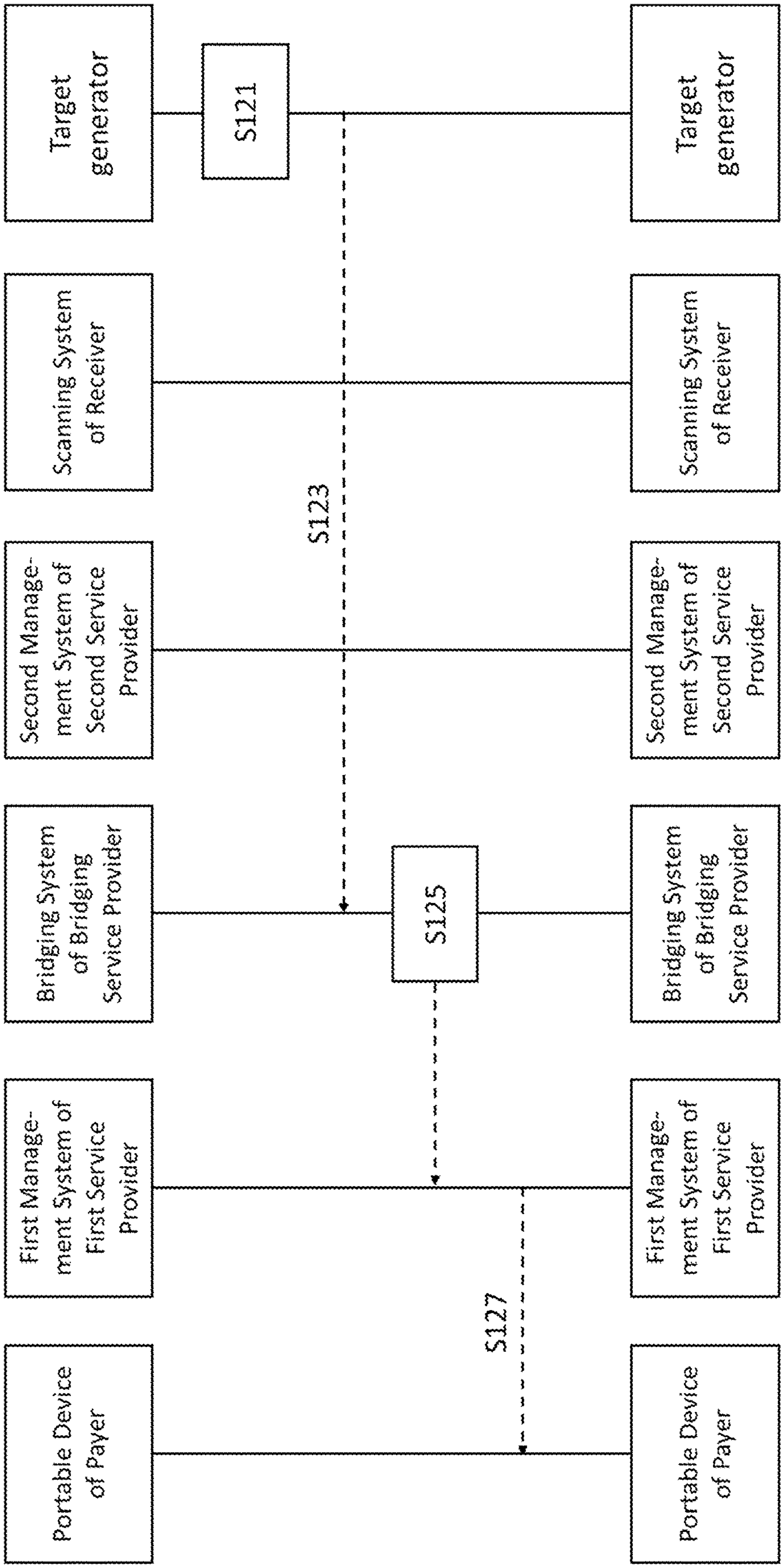
FIG. 4 is a flow chart illustrating the steps of providing a target content or bridging target from the target generator in the system.

FIG. 4 is a sequence diagram showing an example of generating a bridging target or target content, and providing it to the payer 110 of the first service provider. After receiving the target request, the target generator 160 may generate and provide a bridging target or target content to the portable device 115 of the payer 110. In step S121, the target generator 160 may generate a bridging target or target content, and map it to the bridging transaction identifier. In one embodiment, the target generator 160 may also generate a first time stamp indicating a first time point the bridging target or target content is generated. The first time stamp may be stored individually, or may be stored as part of the bridging target or target content. In step S123, the target generator 160 then provide the bridging target or target content to the bridging system 135 of the bridging service provider 130, along with the first time stamp if available. Besides the first time stamp, the target generator 160 may also provide a valid period indicating the period for the target content or the bridging target to remain valid. Alternatively, the target generator 160 may provide a expiration time directly to indicate the time point the target content or the bridging target expires.

In step S125, after receiving the bridging target or the target content, the bridging system 135 may map the bridging transaction identifier to the bridging payer identifier and return the bridging target or the target content to the first management system 125 of the first service provider 120. In step S127, the first management system 125 may convert the received target content into a bridging target and provide the bridging target to the portable device 115 of the payer 110. Actually, the target content may be converted into the bridging target by the target generator 160, the bridging system 135 of the bridging service provider 130, or the portable device 115 of the payer 110.

Figure 5:
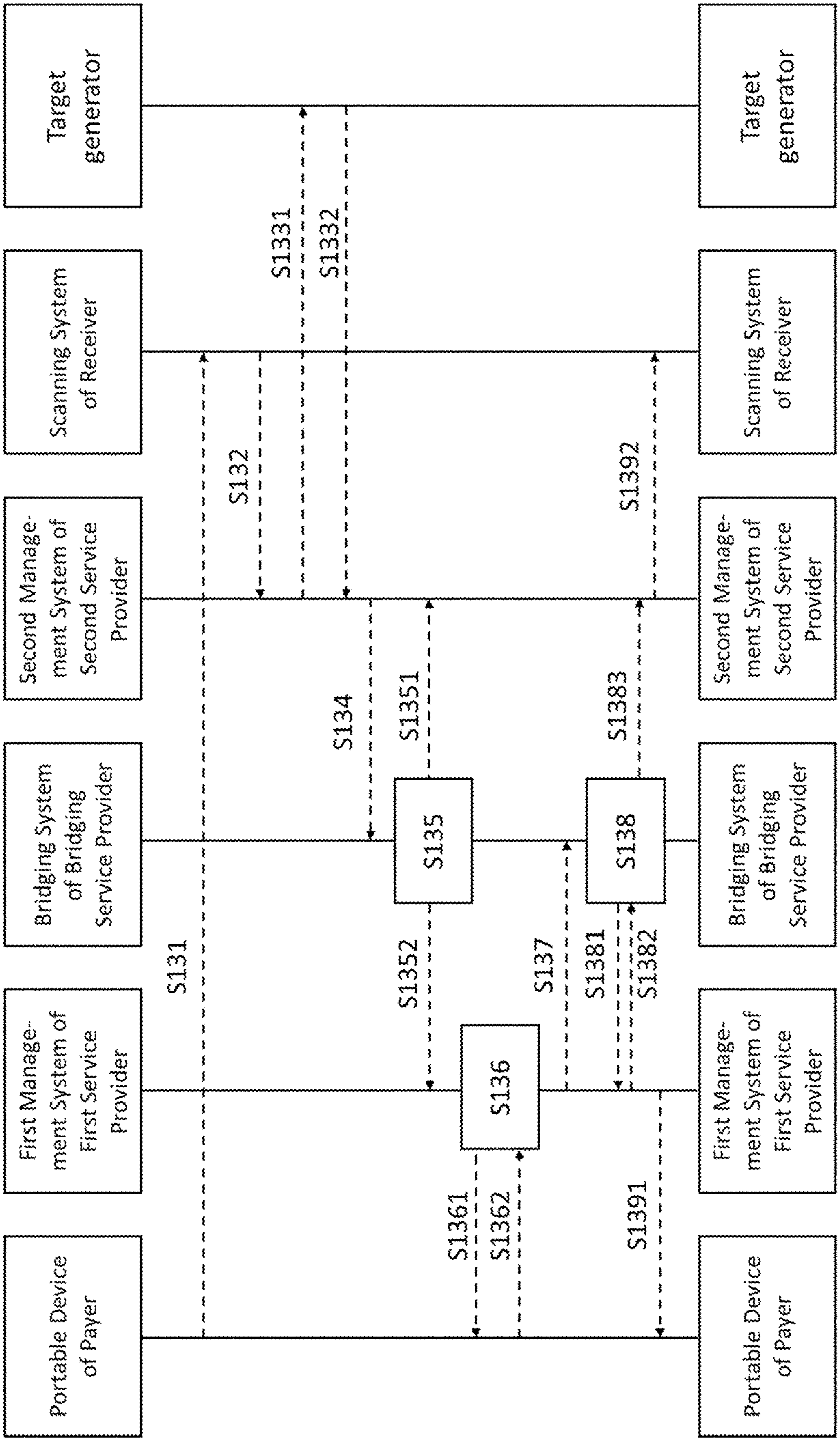
FIG. 5 is a flow chart illustrating the steps of scanning the bridging target and processing the transaction between the payer of the first service provider and the receiver of the second service provider.

The bridging target may be presented to the receiver 150 to proceed with the transaction, as shown in FIG. 5. In step S131, the scanning system 155 of the receiver 150 may scan the bridging target presented by the payer 110 on the portable device 115. In step S132, after scanning the bridging target, the scanning system 155 may transmit the scanned information to the second management system 145 of the second service provider 140 to initiate a transaction request. The scanning system 155 may also transmit a second time stamp indicating a second time point the bridging target is scanned. The second time stamp may also be generated by the second management system 145 once it receives the scanned information from the scanning system 155. To ensure the security of the transaction, if the time difference between the first time stamp and the second time stamp exceeds a predetermined period, the transaction may be considered invalid. Upon receipt of the scanned information, the second management system 145 of the second service provider 140 may request the target generator 160 to return the bridging transaction identifier mapped with the scanned bridging target, as shown in step S1331, and the target generator 160 may then return the bridging transaction identifier based on related mapping generated previously in step S121, as shown in step S1332.

In step S134, the second management system 145 may send a transaction request to the payer 110 via the bridging system 135, along with the bridging transaction identifier. In step S135, upon receipt of the transaction request, the bridging system 135 of the bridging service provider 130 may resolve the bridging transaction identifier of the scanned bridging target to the bridging payer identifier representing the payer 110 of the first service provider 120. If the resolution is successful, the bridging system 135 of the bridging service provider 130 may return an acknowledgement to the second management system 145, as shown in step S1351. The bridging system 135 then may forward the transaction request with the bridging payer identifier to the first management system 125 of the first service provider 120, as shown in step S1352.

In step S136, upon authorization, the first management system 125 of the first service provider 120 may approve the transaction. The first management system 125 may be authorized to approve the transaction automatically, where no further authorization by the payer 110 is required. Alternatively, the payer's approval of transaction is required to improve the security of the transaction. In this case, the first management system 125 may identify the payer 110 by the bridging payer identifier and request the payer 110 to approve the transaction via the portable device 115, and the portable device 115 may then provide the transaction approval to the first management system 125, as shown in step S1361 and S1362. The first management system 125 may further transmit the transaction approval to the bridging system 135, as shown in step S137.

In step S138, upon receipt of the transaction approval, the bridging system 135 may process the transaction with the bridging payer identifier mapped to the payer's account. The related transaction information may be connected by the bridging transaction identifier. For each bridging transaction identifier, the first service provider 120 may have a corresponding X transaction ID and the second service provider 140 may have a corresponding Y transaction ID. As described above, the X transaction ID may be the bridging payer identifier, or a separately generated ID. Similarly, the Y transaction ID may be the receiver/merchant identifier, or a separately generated ID. The mapping between the bridging transaction identifier and the X transaction ID may be stored and maintained by the bridging system 135 and/or the first management system 125. The mapping between the bridging transaction identifier and the Y transaction ID may be stored and maintained by the bridging system 135 and/or the second management system 145. In one embodiment, to enhance privacy protection, the bridging system 135 of the bridging service provider 130 may generate a job ID for each bridging transaction identifier for the transaction recording, which may be stored in a distributed ledger, such as a blockchain. As a result, the bridging system 135 may record each transaction with a job ID, a payer virtual wallet, a receiver virtual wallet, an amount and a currency. In another embodiment, the bridging system 135 of the bridging service provider 130 may generate multiple job IDs for a single bridging transaction identifier, in which multiple parts of the transaction, corresponding to payment, refund, and cancellation, may be recorded using different job IDs that all correspond to one bridging transaction identifier. The bridging system 135 then may push a notification of successful payment to the first management system 125 (step S1381) and receive the acknowledgement from the first management system 125 (step S1382). Upon receipt of the acknowledgement, the bridging system 135 then may push a notification of successful payment to the second management system 145, as shown in step S1383. Lastly, notifications of successful payment may be individually pushed from the first management system 125 of the first service provider 120 to the portable device 115 of the payer 110 (step S1391), and from the second management system 145 of the second service provider 140 to the scanning system 155 of the receiver 150 (step S1392).

Figure 6:
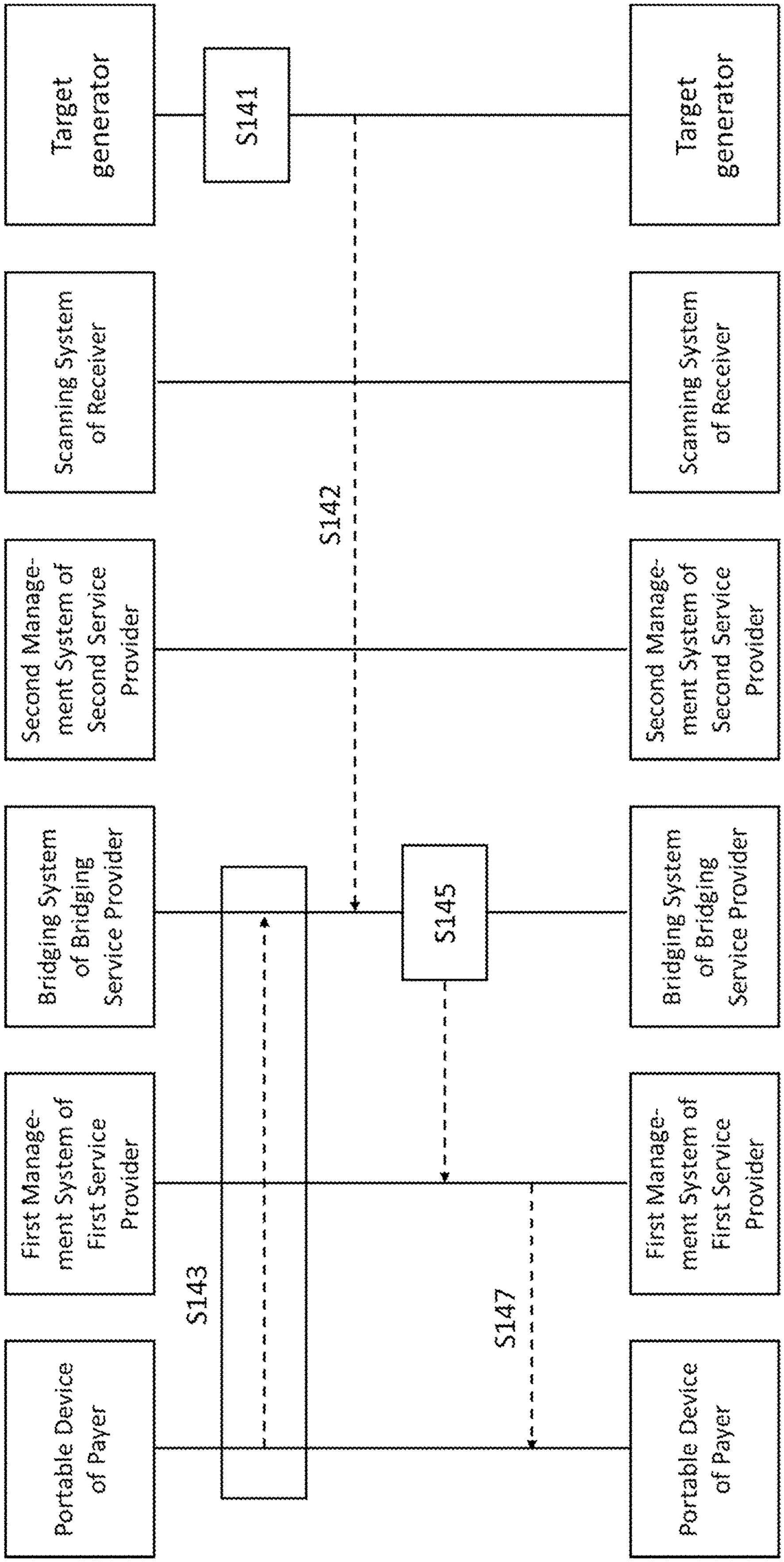
FIG. 6 is a flow chart illustrating the steps of an alternative embodiment of providing a target content or bridging target without requesting one in advance.

In another embodiment, no target request is sent by the bridging system 135, and the target generator 160 may provide the bridging targets or target contents automatically based on some predetermined criteria, such as the historical data of bridging target usage, as shown in FIG. 6. In step S141, the target generator 160 may generate the bridging target or target content, and then map it to the bridging transaction identifier. In step S142, the target generator 160 may automatically send the bridging targets or target contents mapped with the bridging transaction identifiers to bridging system 135 when some criteria are met. For example, the target generator 160 may monitor the usage of previously sent bridging targets or target contents and provide newly generated bridging targets or target contents when the number of unused targets falls below a predetermined value. In this case, the bridging system 135 of the bridging service provider 130 may be able to recognize the bridging transaction identifier generated by the target generator 160 and map the bridging transaction identifier to the bridging payer identifier of a payer 110. In step S143, the payer 110 may request a bridging target, and the detailed procedure is similar to which described in steps S111-S117.

In step S145, after receiving bridging targets or target contents from the target generator 160 and the target request from the first management system 125, the bridging system 135 of the bridging service provider 130 may map the bridging transaction identifier (provided by the target generator 160) to the bridging payer identifier (provided by the first management system 125), and provide the bridging targets or target contents to the first management system 125. In another embodiment, the target generator 160 may also provide the bridging targets or target contents automatically to the payer 110 via the first management system 125 without request. One example is that when the first management system 125 detects a bridging target used by the payer 110 of its transaction network, the first management system 125 may notify the bridging system 135, and the bridging system 135 may map the bridging transaction identifier to the bridging payer identifier provided by the first management system 125, and then provide the bridging target or target content. The bridging system 135 may even provide the payer 110 the bridging target or target content without a request from the first management system 125. In this case, when a bridging transaction is requested, the bridging system 135 may detect the event and supplement a bridging target or target content according to the bridging payer identifier provided by the first management system 125. The target content or the bridging target then may be provided to the payer 110 by the first management system 125 without requesting one first. In step S147, the first management system 125 of the first service provider 120 may convert the received target content into a bridging target and provide the bridging target to the portable device 115 of the payer 110. Alternatively, the target content may be converted into the bridging target by the target generator 160, the bridging system 135, or the portable device 115.

In another embodiment, the target generator 160 may generate bridging targets or target contents for a digital coupon which may be used to redeem a freebie by a payer 110 from the receiver 150, which is a merchant. In this embodiment, the target generator 160 may not need to provide a bridging transaction identifier for the bridging target or target content generated. In this case, the bridging targets may be allowed to be distributed by the bridging service provider 130 freely to promote the receiver 150, e.g. a merchant store. Upon target recognition, the second management system 145 of the second service provider 140 may only record which target is used, and the freebie may be provided to the payer 110 directly without recording a transaction.

The foregoing description of embodiments are provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A method for target bridging between a portable device of a payer of a first service provider and a scanning system of a receiver of a second service provider different from the first service provider, comprising:

receiving, by a first management system of the first service provider, a target content of a second service provider or a bridging target generated based on the target content, from a bridging system of a bridging service provider for the payer; and wirelessly providing, by the first management system of the first service provider, either (1) the target content of the second service provider, to the portable device of the payer for the portable device to generate the bridging target based on the target content and present the bridging target to the scanning system of the receiver of the second service provider, or (2) the bridging target, to the portable device of the payer to present the bridging target generated based on the target content to the scanning system of the receiver of the second service provider;

wherein the scanning system of the receiver recognizes the bridging target but does not recognize a target of the first service provider.

2. The method of claim 1, wherein each of the target and the bridging target is a QR code.

3. The method of claim 1, wherein the first service provider is located in a first country and the second service provider is located in a second country, and the first country is different from the second country.

4. The method of claim 1, before receiving the target content of the second service provider or the bridging target further comprising:

wirelessly receiving, by the first management system, a target content request from the portable device of the payer for the target content of the second service provider; and providing, by the first management system, the target content request to the bridging system.

5. The method of claim 1, after wirelessly providing the target content of the second service provider or the bridging target to the portable device of the payer to present the bridging target to the scanning system of the receiver further comprising:

receiving, by the first management system, a transaction request from the bridging system after the scanning system of the receiver scans the bridging target;

providing, by the first management system, a transaction approval to the bridging system; and receiving, by the first management system, a transaction notice from the bridging system, after the bridging system records a transaction associated with the transaction notice.

6. The method of claim 5, before providing the transaction approval to the bridging system further comprising:

wirelessly providing, by the first management system, the transaction request to the portable device of the payer; and wirelessly receiving, by the first management system, the transaction approval from the portable device of the payer.

7. The method of claim 4, further comprising:

authenticating, by the first management system, both the payer and the portable device of the payer.

8. The method of claim 7, wherein the first management system authenticates both the payer and the portable device of the payer before providing the target content request to the bridging system.

9. The method of claim 5, further comprising:

determining, by the first management system, whether the transaction is valid before providing the transaction approval to the bridging system.

10. The method of claim 1, wherein the target content comprises a first time stamp indicating a first time point the target content is generated.

11. The method of claim 5, wherein:

the target content comprises a first time stamp indicating a first time point the target content is generated; and the transaction request comprises a second time stamp indicating a second time point the scanning system of the receiver scans the bridging target.

12. The method of claim 11, further comprising:

determining whether the time difference between the first time stamp and the second time stamp exceeds a predetermined period.

13. The method of claim 1, wherein the bridging service provider is the first service provider or the second service provider.

14. The method of claim 1, wherein the bridging service provider is neither the first service provider nor the second service provider.

15. The method of claim 1, wherein the bridging system of the bridging service provider is capable of providing the target content of multiple different service providers.

16. The method of claim 15, wherein said multiple different service providers are located in multiple different countries.

17. The method of claim 4, wherein the bridging system generates a bridging transaction identifier after receiving the target content request from the first management system.

18. The method of claim 17, after wirelessly providing the target content of the second service provider or the bridging target to the portable device of the payer to present the bridging target to the scanning system of the receiver further comprising:

receiving, by the first management system, a transaction request from the bridging system after the scanning system of the receiver scans the bridging target;

providing, by the first management system, a transaction approval to the bridging system; and receiving, by the first management system, a transaction notice from the bridging system, after the bridging system records a transaction associated with the transaction notice;

wherein the bridging system generates at least one job ID corresponding to the bridging transaction identifier and records the transaction based on the job ID.

19. The method of claim 5, wherein the bridging system records the transaction in a distributed ledger.

20. The method of claim 1, wherein a list of the second service provider is selected based on a location of the portable device of the payer.

21. A method for target bridging between a portable device of a payer of a first service provider and a scanning system of a receiver of a second service provider different from the first service provider, comprising:

receiving, by a bridging system of a bridging service provider, a target content of the second service provider or a bridging target generated based on the target content, from a target generator; and providing, by the bridging system of the bridging service provider, the target content or the bridging target to the first management system of the first service provider, so that the first management system of the first service provider transmits either (1) the target content, to the portable device of the payer for the portable device to generate the bridging target based on the target content and present the bridging target to the scanning system of the receiver, or (2) the bridging target, to the portable device of the payer for the portable device to present the bridging target generated based on the target content to the scanning system of the receiver;

wherein the scanning system of the receiver recognizes the bridging target but does not recognize a target of the first service provider.

22. The method of claim 21, wherein each of the target and the bridging target is a QR code.

23. The method of claim 21, wherein the first service provider is located in a first country and a second service provider is located in a second country, and the first country is different from the second country.

24. The method of claim 21, wherein the target generator is a system of the second service provider.

25. The method of claim 21, wherein the target generator is a system of the bridging service provider.

26. The method of claim 21, before receiving the target content of the second service provider further comprising:

receiving, by the bridging system, a target content request from the first management system for the target content of the second service provider; and providing, by the bridging system, the target content request to the target generator.

27. The method of claim 21, after providing the target content or the bridging target to the first management system further comprising:

receiving, by the bridging system, a transaction request from a second management system of the second service provider after the scanning system scans the bridging target;

providing, by the bridging system, the transaction request to the first management system;

receiving, by the bridging system, a transaction approval from the first management system after a transaction associated with the transaction request is approved; and recording, by the bridging system, the transaction.

28. The method of claim 21, wherein the bridging system receives a first time stamp from the target generator in addition to the target content or the bridging target.

29. The method of claim 27, wherein:

the bridging system receives a first time stamp from the target generator in addition to the target content or the bridging target, and the first time stamp indicates a first time the target content or the bridging target is provided; and the bridging system receives a second time stamp from the second management system in addition to the transaction request, and the second time stamp indicates a second time the scanning system scans the target.

30. The method of claim 29, further comprising:

determining whether the time difference between the first time stamp and the second time stamp exceeds a predetermined period.

31. The method of claim 21, wherein the bridging service provider is neither the first service provider nor the second service provider.

32. The method of claim 31, wherein the bridging system of the bridging service provider is capable of providing the target content of multiple different service providers.

33. The method of claim 32, wherein said different service providers located in multiple different countries.

34. The method of claim 26, wherein the bridging system generates a bridging transaction identifier after receiving the target content request from the first management system.

35. The method of claim 34, after providing the target content or the bridging target to the first management system further comprising:

receiving, by the bridging system, a transaction request from a second management system of the second service provider after the scanning system scans the bridging target;

providing, by the bridging system, the transaction request to the first management system;

receiving, by the bridging system, a transaction approval from the first management system after a transaction associated with the transaction request is approved; and recording, by the bridging system, the transaction;

wherein the bridging system generates at least one job ID corresponding to the bridging transaction identifier and records the transaction based on the job ID.

36. The method of claim 21, wherein a second management system of the second service provider records the transaction in a distributed ledger.

37. The method of claim 21, wherein a list of the second service provider is selected based on a location of the portable device of the payer.

* * * * *